US007289513B1

(12) United States Patent
Medved et al.

(10) Patent No.: US 7,289,513 B1
(45) Date of Patent: Oct. 30, 2007

(54) SWITCHING FABRIC PORT MAPPING IN LARGE SCALE REDUNDANT SWITCHES

(75) Inventors: Jan Medved, Pleasanton, CA (US); John Ellis, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 09/883,062

(22) Filed: Jun. 15, 2001

(51) Int. Cl.
*H04L 12/56* (2006.01)

(52) U.S. Cl. .................. 370/395.31; 370/244; 370/254

(58) Field of Classification Search ............... 370/389, 370/392, 254, 394, 390, 396, 395.3, 395.7, 370/255, 397, 400, 409, 241.1, 244, 242, 370/225–227, 228, 216–220, 241, 250, 202; 709/224, 223, 238, 395.31; 379/269, 272; 711/202
See application file for complete search history.

(56) References Cited

U.S. PATENT DOCUMENTS

| 5,166,926 | A | * | 11/1992 | Cisneros et al. ............ 370/392 |
| 5,724,347 | A | * | 3/1998 | Bell et al. ................... 370/377 |
| 5,765,032 | A | * | 6/1998 | Valizadeh .................... 709/235 |
| 6,078,963 | A | * | 6/2000 | Civanlar et al. ............. 709/238 |
| 6,370,155 | B1 | * | 4/2002 | Cantwell et al. ............ 370/465 |
| 6,385,200 | B1 | * | 5/2002 | Erami et al. ............ 370/395.42 |
| 6,411,599 | B1 | * | 6/2002 | Blanc et al. ................. 370/219 |
| 6,442,758 | B1 | * | 8/2002 | Jang et al. ................... 725/119 |
| 6,614,758 | B2 | * | 9/2003 | Wong et al. ................. 370/232 |
| 6,628,609 | B2 | * | 9/2003 | Chapman et al. ............ 370/229 |
| 6,674,756 | B1 | * | 1/2004 | Rao et al. ............... 370/395.21 |
| 6,735,212 | B1 | * | 5/2004 | Calamvokis ................ 370/412 |
| 6,738,828 | B1 | * | 5/2004 | Keats et al. ................. 709/245 |
| 6,798,784 | B2 | * | 9/2004 | Dove et al. .................. 370/463 |
| 6,879,559 | B1 | * | 4/2005 | Blackmon et al. .......... 370/225 |
| 6,888,792 | B2 | * | 5/2005 | Gronke ....................... 370/227 |
| 2002/0093952 | A1 | * | 7/2002 | Gonda ......................... 370/369 |
| 2002/0103921 | A1 | * | 8/2002 | Nair et al. ................... 709/232 |
| 2002/0141344 | A1 | * | 10/2002 | Chidambaran et al. ..... 370/236 |
| 2003/0031126 | A1 | * | 2/2003 | Mayweather et al. ....... 370/223 |
| 2003/0179712 | A1 | * | 9/2003 | Kobayashi et al. ......... 370/249 |

OTHER PUBLICATIONS

"Cisco MGX 8850 - Wide-Area IP +ATM Switch," Cisco Product Catalog, pp. 1-12 (Aug. 2000).
"Cisco - MGX8850 Potential PXM1 Loss of Database Synchronization," http://www.cisco.com/warp/public/770/fn12863.html, 2 pgs. (Aug. 7, 2000).

* cited by examiner

*Primary Examiner*—Doris H. To
*Assistant Examiner*—Habte Mered
(74) *Attorney, Agent, or Firm*—Blakely, Sokoloff, Taylor & Zafman LLP (57) ABSTRACT

A method and system for mapping logical fabric ports to line ingress queues. The system provides for the mapping of line ingress queues to logical destination ports instead of to physical fabric ports. The association of ingress queues with logical destination ports enables a doubling of the switch port capacity that is available when redundancy is employed on all switch ports within the switching fabric. The method and system provides for the distributed broadcasting of mapping table updates. The system employs a multi-shelf switching fabric. Upon the active-standby switchover of a shelf line card, the shelf manager on the impacted shelf, broadcasts by means of a broadcast control cell (BCC), mapping table updates to the TM ASICs associated with each shelf in the shelf cluster. These updates include the current logical to physical port mappings of the logical and the physical ports located on the impacted shelf.

27 Claims, 7 Drawing Sheets

BCC UPDATES WITH BROADCAST ENTITY IN SWITCHING FABRIC

SWITCHING FABRIC PORT MAPPING IN LARGE SCALE REDUNDANT SWITCHES

FIELD OF THE INVENTION

The present invention relates generally to switching fabric port mapping. More particularly, the present invention relates to port mapping in switching arrangements that employ redundant line card configurations.

BACKGROUND

A network switch is a device that forwards data packets from a source network component or components to a destination network component or components. Typically, a network switch receives data packets from a source network component on a first set or sets of ports ("Ingress ports") and forwards data packets to a destination network component or components on a second set or sets of ports ("egress ports").

Currently, network switches are being developed to improve device performance. The performance of a network switch may be characterized using several metrics including connectivity. Connectivity relates to the number of ingress ports and egress ports that the network switch can interconnect. The connectivity of a switch affects the device's switching capacity.

High system availability is a key requirement in the design of ATM, IP, data, voice or multimedia switching systems. High availability in such systems is typically achieved by the use of redundant common control hardware, and redundant switching fabrics. In addition the line cards actually carrying the user traffic may be redundant in either 1 for 1, or 1 for N configurations. If a protected line cards fails, or is removed the back up or standby line card takes over. Typically it is required that this switch over occurs in less than 20 ms, in order to minimize impact on user data.

Currently to achieve the fast switchover times required, it is necessary to embed special logic within the hardware that makes up the switch fabric. Hardware mechanisms are used because it is a requirement for this type of product that traffic flow be reestablished in less than 20 ms. For connection based networking applications such as are supported in ATM, it is not possible to reestablish tens of thousands of connections within this period of time by using software connection re-routing.

There are two models that are used today in switch fabrics to achieve the required switch over time. One way that this may be accomplished is by using a control mechanism within the switch fabric that facilitates logical to physical port mapping. The switch fabric resulting from this approach can support 1 actual card for 1 standby card sparing as well as several cards (N) with one standby card sparing. Another way to achieve the required switching time is by replicating the data so that the same information simultaneously arrives at the two line cards which are part of the sparing group, (note this method cannot support the 1 for N application).

In the first case the switching fabric is controlled via a central entity which directly controls the internal routing of frames or cells across the switching fabric. When a failure of the active destination line card is detected then the central switch software control mechanism in conjunction with the special capability built into the switching fabric maps all traffic with the logical port number associated with the destination card to the new physical port address of the newly active card.

It should be noted that it is the failure of the destination card that causes the re-mapping to occur, and the software within the source card (which may also be redundant) is not involved in dealing with the destination card failure recovery procedures.

This redundancy switchover mechanism is dependent on a centralized software control system that can manage the state of all line cards within the switching fabric and special facilities built into the switching fabric that provides for support of the physical to logical port mapping, and supports the re-mapping of traffic under the control of a centralized software control.

In addition, to avoid head of line blocking, the source line card has individual queue and traffic management structures and one or more fabric ingress buffers associated with every destination fabric port in the system. As the number of fabric ports in the system grows then the number of ingress queues and buffers within the line cards also grows. These queues and buffers are directly mapped to a physical destination port on the fabric. In the case where one for one line card redundancy is employed, this results in a wasting of the queue and buffer resources, which becomes a significant implementation problem when the number of fabric ports increases to 100 or more.

In the second case line card redundancy is achieved by replicating the ingress traffic to the two destination ports associated with the redundant line card pair. The difficulty here is determining where this data replication occurs. If it occurs in the ingress line card then the load transmitted into the fabric is doubled. This could result in reducing by half the usable switching capacity of the fabric. The other place where replication is possible is within the fabric itself. This is possible without impacting the switching fabric capacity. However, the problem here is that commercially available high capacity switching fabric ASICs or systems may not be designed with this capability. It therefore becomes necessary to create a line card redundancy capability "outside" of the actual switching fabric as part of the line card interface that connects to a switching fabric port.

New high capacity switching systems are being developed that consist of multiple shelves that provide scalability and rely on a distribution of the software responsible for the control of the hardware. In addition commercially available solutions provide the ASICs required to build these high capacity switches. However, in many cases these switching ASICs are not designed to support the redundancy model previously described.

SUMMARY OF THE INVENTION

A method of switching fabric port mapping. Fabric specific broadcast control cells are broadcast. The broadcast control cells are transmitted to multiple shelves. The broadcast control cells are replicated to each port on each of the shelves and forwarded to all shelves attached to the switching fabric. The broadcasts contain the current switching port mappings.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for mapping logical fabric ports to line ingress queues is disclosed. The system provides for the mapping of line ingress queues to logical destination ports instead of to physical fabric ports. The association of ingress queues with logical destination ports enables a doubling of the switch port capacity that is available when redundancy is employed on all switch ports within the switching fabric.

Additionally, the method and system provides for the distributed broadcasting of mapping table updates for systems that employ multiple line card shelves. Upon the active-standby switchover of a shelf line card, the shelf manager on the shelf, broadcasts, by means of a broadcast control cell (BCC), mapping table updates to each Traffic Management Application Specific Integrated Circuit (TM ASIC) associated with each shelf in the multi-shelf cluster. These updates include the current logical to physical port mappings of the logical and the physical ports located on the impacted shelf, and may support either 1 for 1 or 1 for N sparing.

The approach described herein allows line card redundancy with low recovery times, to be to be built using commercially available switching fabric components and systems, which have no special hardware capability. Such a hardware capability has in the past been required in order to achieve the desired recovery times.

The line card redundancy mechanism described herein will also work in a highly distributed switching system consisting of multiple line card shelves. This system may be implemented without the need to provide a single centralized software controller to manage the switch fabric. This is not possible with conventional systems.

In addition the invention describes how by making use of the concept of logical line card to physical port mapping on the ingress line card and interface it is possible to scale the number of line cards in the system by two, without introducing additional queues or buffers on each individual line card.

Certain embodiments of the invention provide certain intended advantages. For example, existing chipsets may be used without any changes for both a 100-line card and a fully-redundant 200-line card system. Generally, this arrangement will help to cut the number of output port queues for new chip designs by 50% (and thus may be important for systems with 2k ports) and double the number of line cards in the system when all line cards are configured in redundant mode (therefore significantly increasing the switch density). There will be less cell loss in source cards during a destination card's active-standby switchovers, because there is only one queue per priority per destination logical slot and the destination card switchover is transparent to source line cards. The logical-to-physical port mapping information is limited to the fabric and the destination logical slot, which allows faster propagation of switchover information. Further, the only entities that need to be globally managed and propagated are logical fabric ports (which happens when a card is introduced and the card is managed by the overlaying cards management system) the ingress queues in line cards and the logical-to-physical fabric port mappings for each shelf are managed locally to the ingress portion of the shelf line cards and their access mechanism into the fabric. This solution would be important in a very large-scale system, such as a terabit switching system consisting of multiple line card shelves and software systems where separate software control mechanisms may be provided for each line card shelf. Such a robust distributed system increases the overall system RAS (Reliability, Availability and Serviceability).

One embodiment associates each output queue with a single logical destination port. The association of ingress queues with logical ports enables a doubling of the number of switch ports that are available when redundancy is employed on all fabric switch ports (line cards). This is an advantage compared to switches that map their line card ingress queues to physical fabric ports. A diagram of such a port mapping arrangement is shown in FIG. 1.

Figure 1:
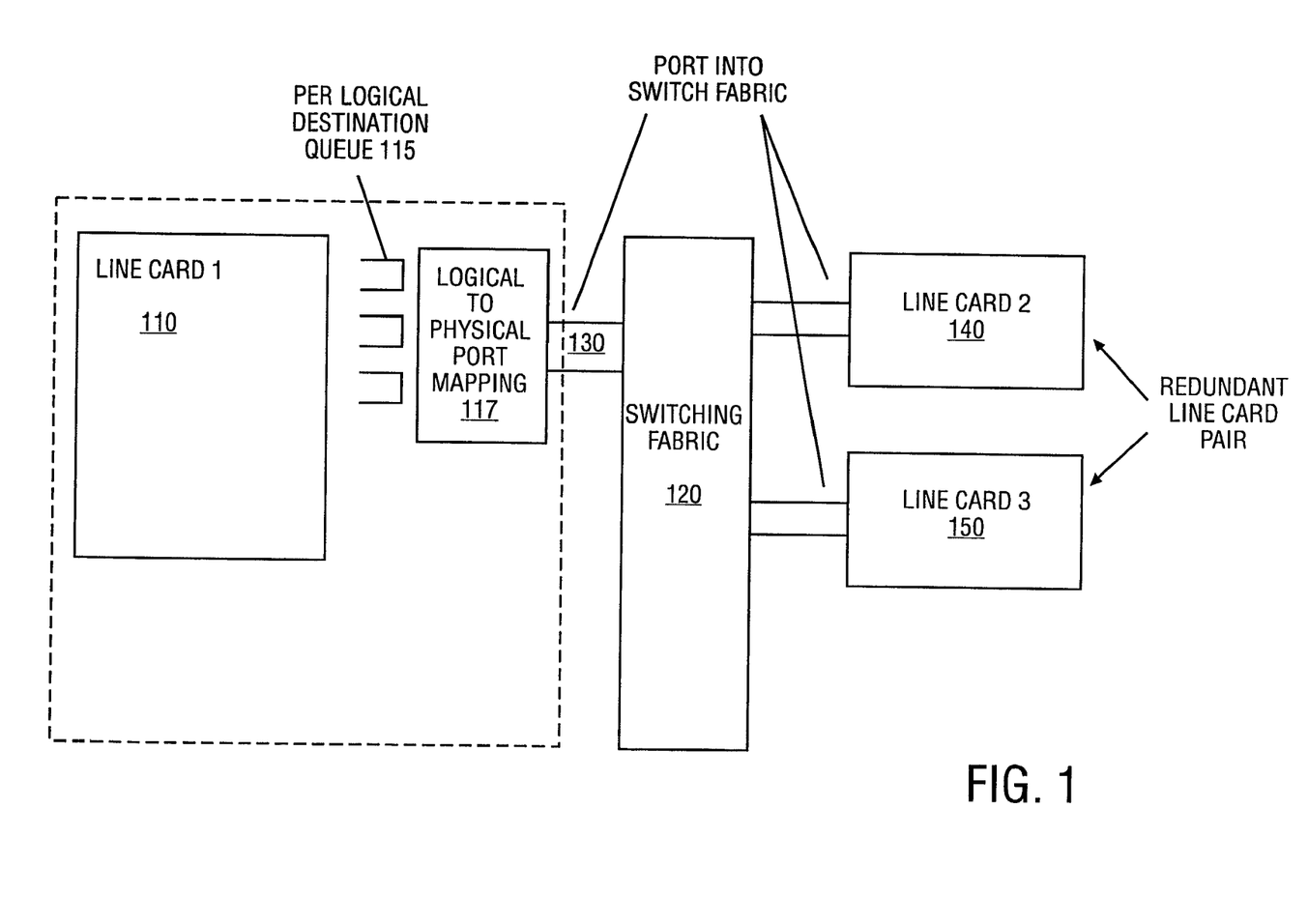
FIG. 1 is a schematic illustrating the port mapping arrangement according to one embodiment of the present invention.

FIG. 1 shows an input line card 110, a queue associated with a logical destination card 115, a logical to physical port mapping module 117, switching fabric 120, logical port 130, and line cards (physical ports) 140 and 150. It should be noted that all line cards normally are duplex, that is they are able to both send traffic into the fabric and receive traffic from the fabric. However, for the purpose of explanation the description only considers ingress traffic from 110 to 140 and 150. In FIG. 1, traffic (frames or cells) sent to source line card 110 are mapped to a queue within the line card associated with the destination logical port 130. Logical port 130 is associated with two physical line cards 140 and 150. The logical port to physical port mapping occurs in port mapping module 117. This module implements this function either by using a logical port destination address field added by the line card 110 to each data packet or cell, or by an explicit mechanism which facilitates configuration or predetermined mapping of a queue buffer to determine the logical port destination of the frame or cell. This module uses a table to remap the logical destination to a physical port on the switching fabric. Usually this is done by adding information to the head of the cell or packet that allows the switching fabric to determine the physical destination fabric port to which the cell or packet should be sent. By adjusting the contents of this table within the module 117 all traffic from one line card can be redirected to another line card. As such, the ingress queues are associated with one logical port 130, and two physical destination slots (cards) 140 and 150. It should be noted that only the destination physical port address is changed, and the line card 110 queues and traffic flow is unaffected. This redundancy represents a doubling of the number of physical destination slots available to traffic transferred from source line card 110.

One embodiment works in TMS (Terabit Multiservice Switch), which employs a multi-shelf terabit switching configuration. TMS line cards use switch interface chips that provide one ingress queue for each logical destination port (120 total).

The switching fabric's interfaces to the line cards are called TM ASIC chips. A diagram showing such a multi-shelved switching fabric is shown in FIG. 2.

Figure 2:
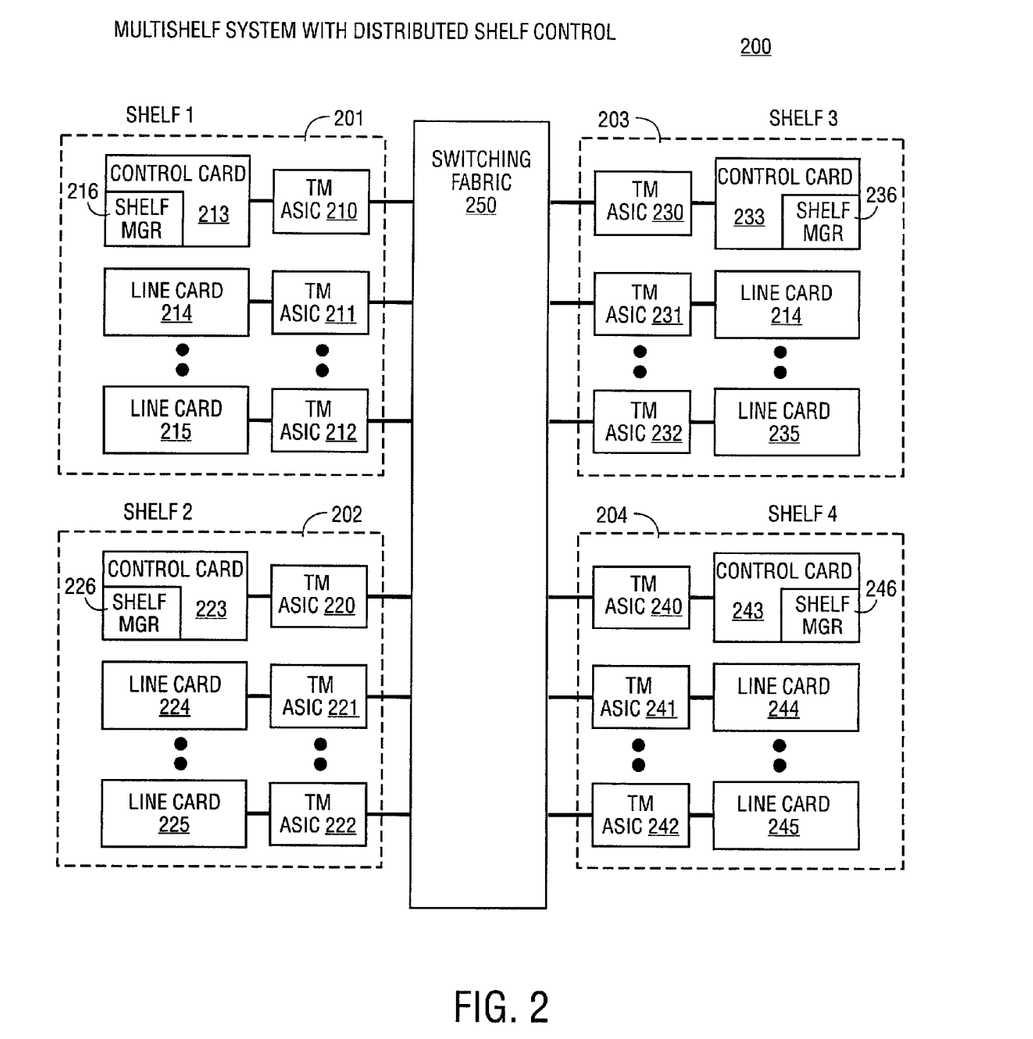
FIG. 2 is a schematic illustrating the mapping process employed in the multi-shelved switching fabric of one embodiment of the present invention.

Referring to FIG. 2 there is shown a multi-shelf terabit switch 200. This multi-shelf configuration is comprised of a series of individual shelves 201 though 204. Each line card and shelf controller card (see FIG. 2) in the system possesses a corresponding TM ASIC chip (210–212, 220–222, 230–232 and 240–242), which acts as the line cards interface to the switching fabric. Every line card and controller card has a TM ASIC and an associated fabric port. Each shelf in the system contains a Shelf Manager software function. The Shelf Manager (216, 226, 236 and 246) is responsible for determining the status of the line cards within the shelf, and will if necessary (as a result of a detected line card failure or a system operator's command) initiate the switch over of an active line card to a back up line card. Each shelf manager in each line card shelf also controls the broadcasting of the current physical-to-logic port mappings to every TM ASIC in the complete TMS system. In this way a Shelf Controller in one line card shelf can manage the state of all line cards within the shelf that it is managing and can also inform every card TM ASIC in the system of the current logical to physical port mapping. Each Shelf controller in each line card shelf is responsible for controlling the logical to physical mapping table in every TM ASIC, but only for the logical ports associated with the line card that it manages. In this way a highly scalable system consisting of 10s or even 100s of line card shelves can be built.

The logical-to-physical fabric port mapping is managed locally. As suggested earlier, the logical-to-physical fabric port mapping tables are located in the TM ASICs. These tables are updated by means of a broadcast control cell (BCC) mechanism. The BCC mechanism is controlled by the shelf manager (216, 226, 236 and 246). Multiple Shelf Managers (see FIG. 2) can exist in the TMS system. In this case each would be responsible for maintaining the logical port to physical line card mapping of the line cards specifically under its control. Each shelf manager can periodically broadcast the current physical-to-logical port mappings pertaining to each active logical port to all other TM ASICs attached to the switching fabric. Upon a failure of an active line card, the broadcast control mechanism will immediately broadcast the change in logical-to-physical fabric port mappings to all TM ASICs attached to the switch fabric ports. The TM ASIC will then redirect all traffic from a line card directed to a specific logical port to the associated newly active destination physical fabric port.

The actual method of broadcast of BCC cells is determined by the capability of the switching fabric being used. If the switching fabric has a built in broadcast mechanism then it may be used. Alternatively, a Shelf Controller software entity can replicate the BCC to each TM ASIC in turn. In either case the receiving TM ASIC identifies the cell as a special control cell type, terminates the cell, and adjusts its logical to physical mapping tables based on the contents of the cell.

For example, referring again to FIG. 2, upon the failure of a line card associated with shelf 201, TM ASIC 210 and shelf manager 216 would co-operate to remap the affected port and broadcast these changes to all TM ASICs in the multi-shelf switching cluster. In this way logical fabric ports are globally managed (by cluster components), while logical to physical mapping can be managed locally (by shelf components). In addition, after the insertion of a new line card in the system the Shelf Manager in the shelf in which the line card is inserted is responsible for the broadcast of the new logical port to physical port mapping to all TM ASICs attached to the fabric.

There may be multiple instances of control cell broadcasting active at the same time. Each instance of such broadcasts affects a subset of the cluster port mapping updates ongoing at that point in time. In TMS, each shelf manager will control one such instance, broadcasting the logical-to-physical port mapping updates for all line cards in its shelf.

Figure 3A:
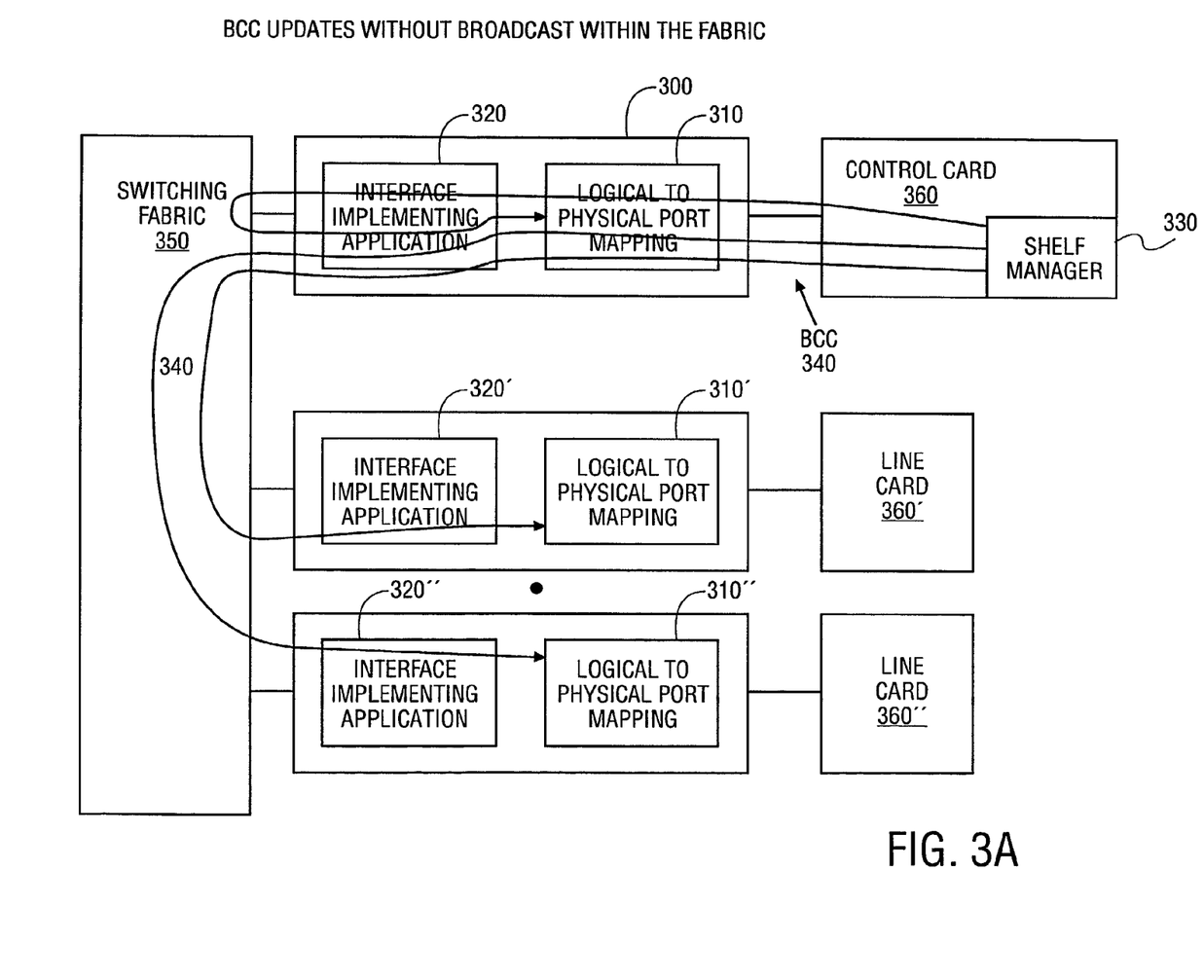
FIGS. 3a and 3b are block diagrams illustrating the core functionalities provided by the TM ASIC (Traffic Management Application Specific Integrated Circuit) of one embodiment of the present invention.

FIG. 3*a* is a block diagram that illustrates the core functionalities provided by one embodiment of the TM ASIC. In particular, it shows its interaction with the shelf manager and its corresponding shelf switching fabric. FIG. 3*a* shows TM ASIC 300, which comprises interface implementing application 320, and port mapping table 310. Also shown are control card 360, shelf manager 330 and the device output 340 to shelf switching fabric 350.

Interface implementing application 320 implements the interface to the switching fabric, which facilitate the flow of traffic across the switch. The data arriving (frames or cells) from the control card or line card may have logical destination port information available in the header, or this logical destination port information may be implicit based on the particular ingress queue the cell or packet arrives from. The logical destination port information derived by either of the two previously described methods is used to ascertain the fabric physical port associated with the logical port description. In addition, the TM ASIC may use this information to implement any destination port level flow control or traffic management that may be included as part of the TM ASIC functionality. Once the interfaces necessary to facilitate traffic flow have been implemented, traffic may be sent across the switch fabric to the destination line card (not shown). The fabric also uses the physical address associated with the packet or cell to direct the packet or cell to the physical port on the fabric and hence to the line card to which the traffic is directed.

Figure 3B:
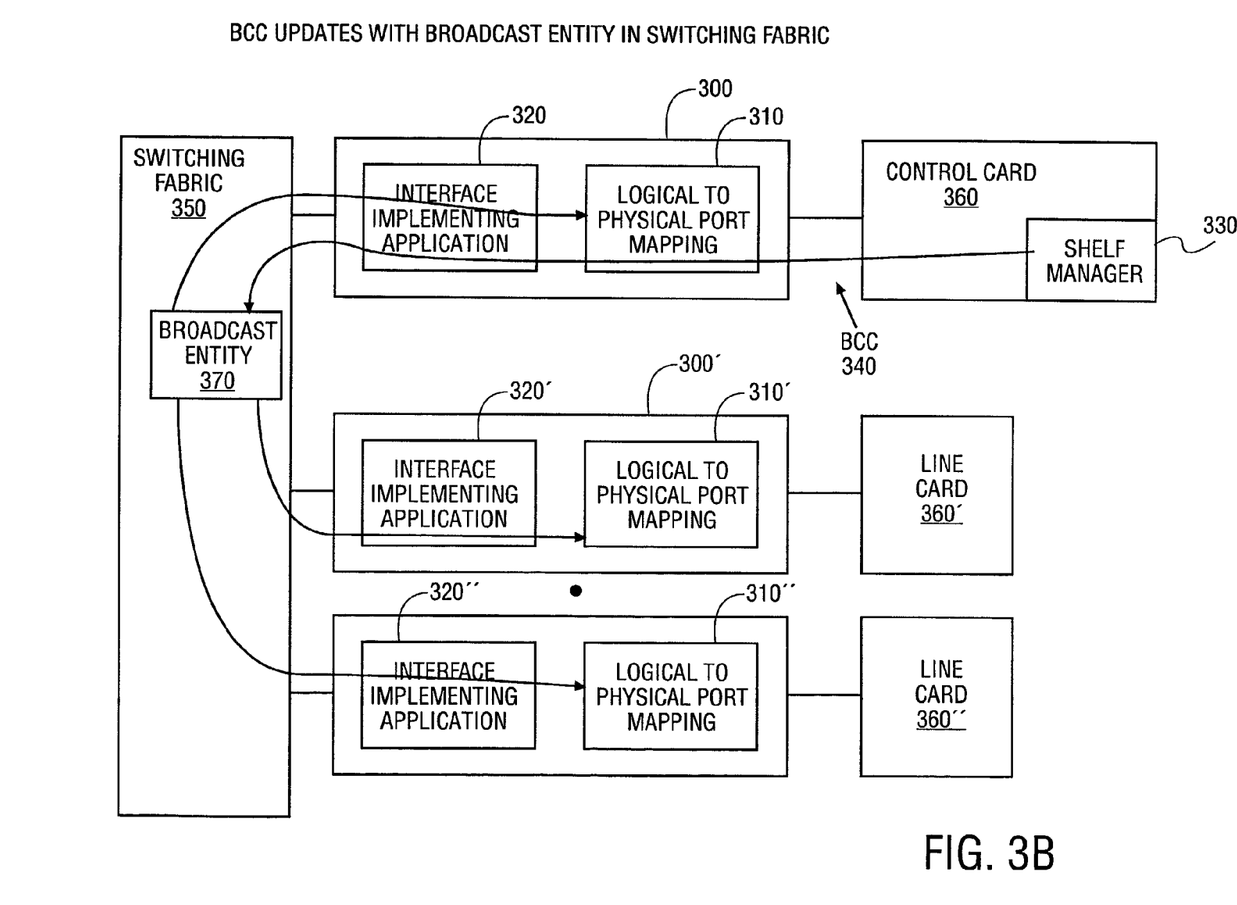

Each port mapping table associated with every port 310, 310', 310" contains the current port mappings pertaining for all logical cards within the system. The port mapping table interacts with interface implementing software, as mentioned above, and also with shelf manager 330. It is the responsibility of each individual shelf manager to insure that a port mapping table's current mapping configuration is maintained across every TM ASIC in the shelf cluster, for all cards in its associated shelf. By definition standby cards do not appear in this logical to physical mapping table. The shelf manager on the impacted shelf sends fabric specific broadcast (through cell replication) cells to every TM ASIC connected to the fabric with the new logical to physical port mapping updates. In an alternative embodiment, a broadcast entity 370 may be located within the switching fabric and may be employed to provide the mapping table updating functions previously described (See FIG. 3*b*). The BCC control cells arriving at the TM ASIC are identified by the TM ASIC as a special cell by a specific type bit setting within the header that identifies the BCC type cell.

Alternatively, if the fabric is unable to support a user defined cell type to support BCC, it is also possible to broadcast the BCC cell such that it is terminated on the processor on the line card. This processor would then using the payload contents identify the cell as being of a BCC type, and use the information carried by the BCC cell to directly adjust the logical to physical mapping table in the TM ASIC. This will be through a local processor bus. The disadvantage of this approach is that it could take a longer period of time to adjust the mapping table contents and hence would extend the amount of time during which user data will be lost.

Figure 4:
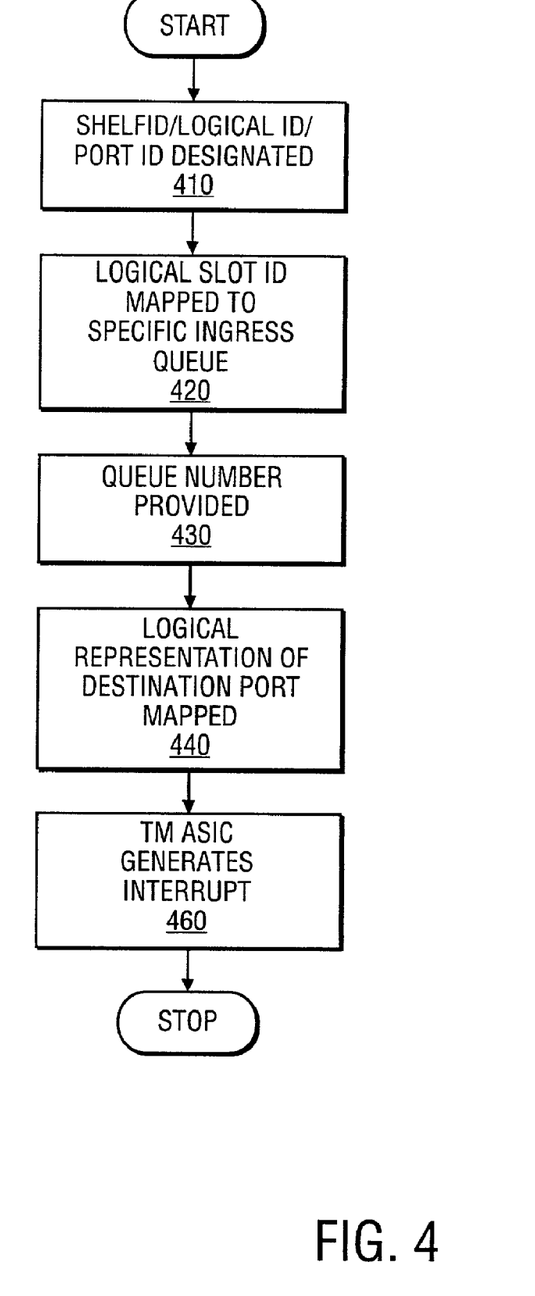
FIG. 4 is a flowchart illustrating the process used to implement a remapping of fabric ports.

FIG. 4 shows the process used to implement the remapping of fabric ports. Referring to FIG. 4, at operation 410, a shelf ID/logical ID/port ID is designated. This designation provides a numerical representation of the physical and logical ports on the system.

At operation 420, the destination logical slot ID is mapped to a specific ingress queue. The mapping is derived from the destination shelf ID and destination slot ID. This process provides a queue number between 0 and 119.

At operation 430, the queue number is provided. The TM ASIC operates off of a mapping table that maps this logical representation of the destination to a physical TMS port number.

At operation 440, as previously mentioned, the TM ASIC maps a logical representation of the destination to a physical TMS port number. At operation 460, if the TM ASIC receives a packet or cell identified as being directed to a specific logical port and there is no logical port entity or physical port entry in the table corresponding thereto then the TM ASIC will discard the frame or cell and generate an interrupt to its locally associated processor.

As mentioned earlier, it is the responsibility of each individual shelf manager to ensure that its associated mapping table is maintained across all TM ASICs for all cards in its associated shelf. Simultaneously updating TM ASIC tables in a very short period of time is critical to meeting the objective of the current invention (20 milliseconds outage on line cards switchover). The line card switchover is controlled by the shelf manager in the specific shelf where the switchover occurred. The shelf manager on the impacted shelf sends fabric specific broadcasts control cells to every TM ASIC connected to the fabric (each shelf) with the new logical to physical mapping instructions. One embodiment of the process used to implement the broadcasting operation is illustrated in FIG. 5.

Figure 5:
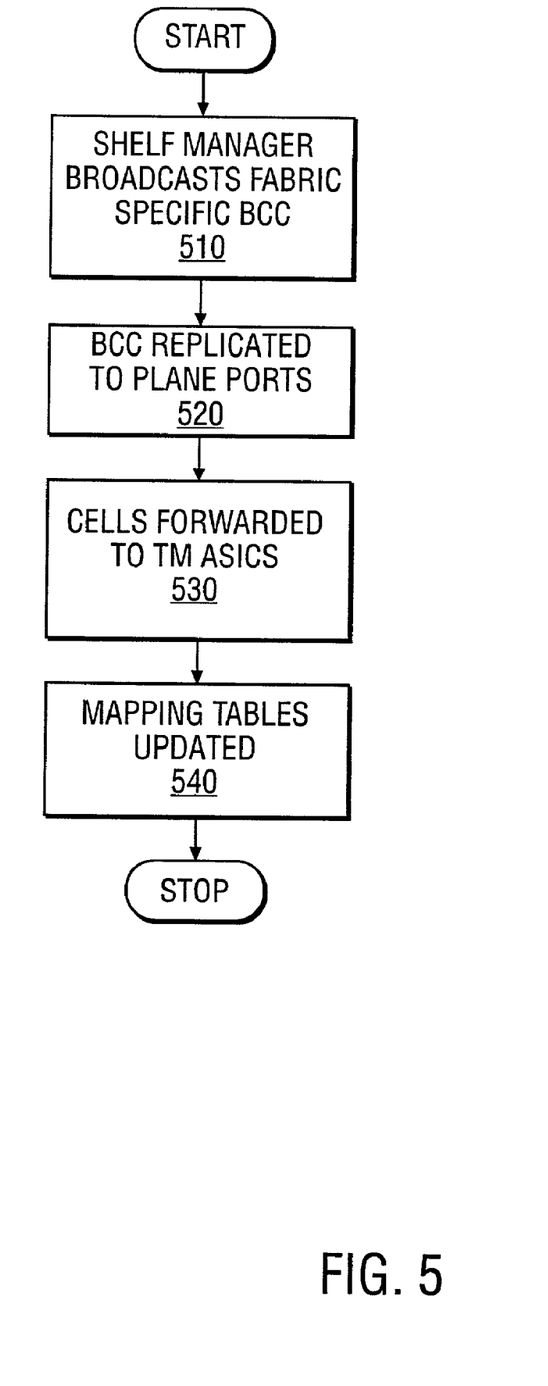
FIG. 5 is a flowchart illustrating a process used to implement a broadcasting operation.

Referring to FIG. 5 at step 510 the shelf manager on the impacted shelf sends a fabric specific broadcast control cell (BCC) to a broadcast entity within the switching fabric.

At operation 520 the BCC is replicated to all physical ports on the switching plane (shelf).

At operation 530 the BCC cells are forwarded through the destination physical port to the TM ASIC associated with that port.

At operation 540 each TM ASIC terminates the received BCC cell and the logical to physical mapping tables are updated based on the content of the BCC message. As mentioned previously, in alternate embodiments the BCC cell may be terminated by a processor located in a line card. After a line card switchover the TM ASIC associated with the newly active (i.e. previously standby) card should have the proper physical to logical mapping for all other line cards in the cluster. It should be noted that all TM ASICs with a connection to the fabric receive all broadcast control cells from every active shelf manager within the TMS cluster. Provided the TM ASICs have received every broadcast control cell ever transmitted within the system, they all should have the same logical to physical mapping tables. However, as time passes, in order to assure the synchronization of all cluster TM ASICs, all active shelf managers must periodically send broadcast cell updates to all TM ASICs.

When a new card joins the fabric, its physical to logical port mapping table must be initialized to allow other cards in the system to have an entry in their TM ASIC logical to physical mapping table corresponding to the new card. Typically this will be done using the same mechanism as described previously. The shelf manager, in the shelf where the new line card has been inserted will broadcast a BCC message containing information about the new card's logical to physical mapping, if the new card is being brought up in an active state. If the new card is being brought up in a standby state no BCC broadcast is initiated.

Figure 6:
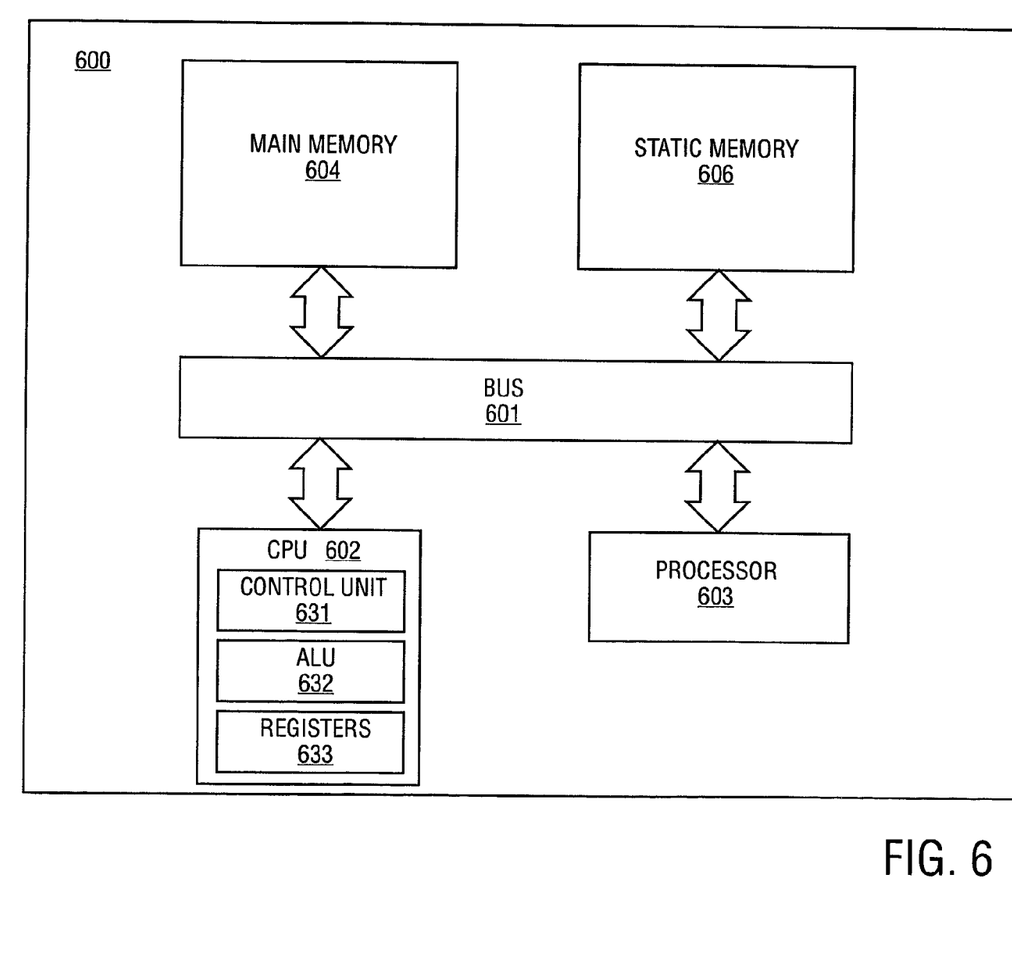
FIG. 6 is a block diagram depicting a processing apparatus.

FIG. 6 depicts an exemplary processing system 600 in which one embodiment of the invention may be implemented. For one embodiment, the interface implementing and mapping table updating instructions may be executed using a general processing architecture. Referring to FIG. 6, the processing system may include a bus 601 or other communication means for communicating information, and a central processing unit (CPU) 602 coupled to the bus for processing information. CPU 602 includes a control unit 631, an arithmetic logic unit (ALU) 632, and registers 633. CPU 602 can be used to implement the interface implementing and mapping table updating functions described herein. Furthermore, another processor 603 such, for example a coprocessor, may be coupled to bus 601 for additional processing power and speed.

The processing system 600 also includes a main memory 604, which may be a random access memory (RAM) device that is coupled to the bus 601. The main memory stores information and instructions to be executed by CPU 602. Main memory 604 may also store temporary variables and other intermediate information during the execution of instructions by CPU 602. The processing system also includes a static memory 606, for example a read only memory (ROM) and/or other static device that is coupled to the bus for storing static information and instructions for CPU 602.

In addition, the methods as described above can be stored in memory of a computer system as a set of instructions to be executed. The instructions to perform the methods as described above could alternately be stored on other forms of computer readable mediums including magnetic and optical disks. For example, the method of the present invention can be stored on computer readable-mediums, such as magnetic disks or optical disks that are accessible via a disk drive (or computer readable medium drive).

In the foregoing specification, the invention has been described with reference to specific exemplary embodiments thereof. It will however, be evident that various modifications and changes may be made thereto without departing from the broader spirit and scope of the invention as set forth in the appended claims. The specification and drawings are, accordingly, to be regarded in an illustrative rather that a restrictive sense.

What is claimed is:

1. A method of switching fabric port mapping for a switching fabric, the method comprising:

associating line ingress queues with logical fabric ports;

broadcasting, via the switching fabric, fabric specific broadcast control cells to all physical ports on all shelves attached to the switching fabric, the broadcast control cells containing logical to physical port mappings; and forwarding packets in the line ingress queues by the switching fabric based on the logical to physical port mappings, wherein updates to the logical to physical port mappings are managed locally by a manager on each of the shelves, and broadcasts of the logical to physical port mappings are sent globally to all of the physical ports on all of the shelves.

2. The method of claim 1 further comprising:
storing the logical to physical port mappings in a plurality of traffic management circuits, each of the traffic management circuits providing an interface between the switching fabric and a line card.

3. The method of claim 1, wherein the presence of a line card on a given fabric logical port is propagated to all other line cards in the system.

4. The method of claim 1, wherein tables of the logical to physical port mappings are updated by a fabric control cell mechanism.

5. The method of claim 4, wherein the fabric control cell mechanism immediately broadcasts a change in the logical to physical port mappings upon the failure of an active line card.

6. The method of claim 5, wherein the fabric control cell mechanism periodically broadcasts the current logical to physical port mappings.

7. The method of claim 6, wherein there are instances of multiple fabric control cell broadcasts ongoing.

8. The method of claim 7, wherein the broadcasts are initiated by a shelf manager on one of the shelves that has at least one physical port impacted by the updates to the logical to physical port mappings.

9. The method of claim 8, wherein shelf managers on all of the shelves periodically send out the broadcast control cells for all line card slots.

10. The method of claim 6, wherein the periodic broadcasts are made even when there is no line card in a given line card slot.

11. A switching fabric port mapping apparatus for a switching fabric, the apparatus comprising:
means for associating line ingress queues to logical fabric ports; and
means for broadcasting, via the switching fabric, logical to physical port mappings to all physical ports and all shelves attached to the switching fabric,
wherein packets in the line ingress queues are forwarded by the switching fabric, and
wherein updates to the logical to physical port mappings are managed locally by a manager on each of the shelves, and broadcasts of the logical to physical port mappings are sent globally to all of the physical ports on all of the shelves.

12. The apparatus of claim 11, wherein each of the line ingress queues is associated with a logical destination port.

13. The apparatus of claim 11, wherein the logical fabric ports are globally managed.

14. The apparatus of claim 11 further comprising:
means for storing the logical to physical port mappings, each means for storing providing an interface between the switching fabric and a line card.

15. A switching fabric port mapping apparatus for a switching fabric, the apparatus comprising:
circuitry to associate line ingress queues to logical fabric ports; and
circuitry to broadcast, via the switch fabric, logical to physical port mappings to all physical ports and all shelves attached to the switching fabric,
wherein packets in the line ingress queues are forwarded by the switching fabric, and
wherein updates to the logical to physical port mappings are managed locally by a manager on each of the shelves, and broadcasts of the logical to physical port mappings are sent globally to all of the physical ports on all of the shelves.

16. The apparatus of claim 15, wherein the logical fabric ports are globally managed.

17. The apparatus of claim 15 further comprising:
a plurality of traffic management circuits, each storing the logical to physical port mappings and providing an interface between the switching fabric and one of the source line cards and the destination line cards.

18. The apparatus of claim 15, wherein there are instances of multiple control cell broadcasts ongoing.

19. A medium readable by a computing device, the medium storing instructions, which when executed by the computing device causes the computing device to perform operations comprising:
associating line ingress queues to logical fabric ports; and
broadcasting logical to physical port mappings, via the switching fabric, to all physical ports and all shelves attached to the switching fabric,
wherein packets in the line ingress queues are forwarded by the switching fabric, and
wherein updates to the logical to physical port mappings are managed locally by a manager on each of the shelves, and broadcasts of the logical to physical port mappings are sent globally to all of the physical ports on all of the shelves.

20. A switching fabric port mapping system comprising:
a multi-shelf switching fabric;
source line cards, each associated with a plurality of line ingress queues;
destination line cards; and
a broadcast control mechanism which broadcasts, via the switching fabric, logical to physical port mappings to all physical ports and all shelves attached to the switching fabric;
wherein packets in the line ingress queues are forwarded by the switching fabric based on the updated logical to physical mappings, and
wherein updates to the logical to physical port mappings are managed locally by a manager on each of the shelves, and broadcasts of the logical to physical port mappings are sent globally to all of the physical ports on all of the shelves.

21. The system of claim 20, further comprising a plurality of traffic management circuits, each storing the logical to physical port mappings and providing an interface between the switching fabric and one of the source line cards and the destination line cards.

22. The system of claim 20, wherein the mappings are executed in a multi-shelf switching environment.

23. The system of claim 20, wherein mapping tables are updated by a fabric control cell mechanism.

24. A method of switching fabric port mapping for a switching fabric, the method comprising:
broadcasting fabric specific broadcast control cells;
transmitting the broadcast control cells, via the switching fabric, to all physical ports on all shelves attached to the switching fabric, the broadcast control cells containing logical to physical port mappings;
terminating the broadcast control cells with a traffic management circuits, each of the traffic management circuits associated with a line card;
updating a port mapping table stored on each of the traffic management circuits according to the broadcast control cells; and
mapping ingress queues to logical fabric ports instead of the physical ports based on updated port mapping tables;

wherein updates to the port mapping tables are managed locally by a manager on each of the shelves, and broadcasts of the logical to physical port mappings are sent globally to all of the physical ports on all of the shelves.

25. The method of claim 24, wherein the traffic management circuit associated with the line card is an interface between the line card and the switching fabric.

26. The method of claim 24, wherein a fabric control mechanism supports either 1 for 1 sparing or 1 for N sparing.

27. The medium of claim 19 wherein the instructions cause the computing device to store the logical to physical port mappings in a plurality of traffic management circuits, each of the traffic management circuits providing an interface between the switching fabric and a line card.

* * * * *